(12) United States Patent
Girkar et al.

(10) Patent No.: US 7,599,967 B2
(45) Date of Patent: Oct. 6, 2009

(54) NO DATA LOSS SYSTEM WITH REDUCED COMMIT LATENCY

(75) Inventors: Mahesh Baburao Girkar, Cupertino, CA (US); Steven McGee, Bedford, NH (US); David Gagne, Goffstown, NH (US)

(73) Assignee: Oracle International Corporation, Redwood Shores, CA (US)

( * ) Notice: Subject to any disclaimer, the term of this patent is extended or adjusted under 35 U.S.C. 154(b) by 385 days.

(21) Appl. No.: 11/688,550

(22) Filed: Mar. 20, 2007

(65) Prior Publication Data

US 2008/0235294 A1 Sep. 25, 2008

(51) Int. Cl.
*G06F 17/30* (2006.01)
(52) U.S. Cl. .................. 707/200; 707/202; 707/204
(58) Field of Classification Search .......... None
See application file for complete search history.

(56) References Cited

U.S. PATENT DOCUMENTS

| 5,742,792 | A * | 4/1998 | Yanai et al. ............. 711/162 |
| 6,625,747 | B1 * | 9/2003 | Tawil et al. ............. 714/6 |
| 6,636,239 | B1 * | 10/2003 | Arquie et al. ............. 715/736 |
| 7,027,053 | B2 * | 4/2006 | Berndt et al. ............. 345/473 |
| 7,058,853 | B1 * | 6/2006 | Kavanappillil et al. ......... 714/13 |
| 7,069,465 | B2 * | 6/2006 | Chu et al. ................. 714/6 |
| 7,203,796 | B1 * | 4/2007 | Muppalaneni et al. ........ 711/114 |
| 2002/0143888 | A1 * | 10/2002 | Lisiecki et al. ............. 709/214 |
| 2004/0073677 | A1 * | 4/2004 | Honma et al. ............. 709/226 |
| 2005/0193132 | A1 * | 9/2005 | O'Brien et al. ............. 709/229 |
| 2006/0149797 | A1 * | 7/2006 | Chai et al. ................. 707/204 |
| 2008/0235291 | A1 * | 9/2008 | Lahiri et al. ................. 707/201 |

OTHER PUBLICATIONS

Tirthanka Lahiri et al., Fast-Start quick fault recovery in oracle, May 2001, ACM, pp. 593-598.*
Emmanuel Cecchet Et al., Middleware-based database replication: the gaps between theory and practice, Jun. 2008, ACM, pp. 739-752.*

* cited by examiner

*Primary Examiner*—Neveen Abel Jalil
*Assistant Examiner*—Jacques Veillard
(74) *Attorney, Agent, or Firm*—Gordon E. Nelson

(57) ABSTRACT

Techniques for reducing commit latency in a database system having a primary database system and a standby database system that is receiving a stream of redo data items from the primary. The standby sends an acknowledgment for a received item of redo data before the standby writes the redo data item to a redo log for the stream. When a no more redo event occurs in the standby, the standby sets a "no data lost flag" in the redo log if the stream of redo data items has no gaps and all of the redo data items received in the standby have been written to the redo log. The database system may operate in a first mode in which an acknowledgment is sent as just described and a second mode in which an acknowledgment is sent after the redo data item has been written to the redo log.

16 Claims, 7 Drawing Sheets

NO DATA LOSS SYSTEM WITH REDUCED COMMIT LATENCY

CROSS-REFERENCE TO RELATED APPLICATIONS

Not applicable

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The invention is related generally to database systems and is more particularly related to database systems which include a primary database system and a standby database system. As the primary database executes transactions, it sends data to the standby database system which permits the standby database system to construct a replica of the current state of the database in the primary database system. If the primary database system fails, the standby can immediately take over for it.

2. Description of Related Art

Overview of High-Availability, Low Data Loss Database Systems

Users of database systems have always been concerned with losing data, and consequently, many techniques have been developed for archiving the information stored in a database system and restoring the database system from the archive. As on-line transaction processing has become one of the most important uses of database systems, users have also become concerned with the loss of availability of a database system. A consequence of these concerns has been the development of database systems which include a primary database system and a standby database system. As the primary database system processes transactions, it not only updates its own database, but produces redo data for each transaction. The redo data describes the change made in the primary database system's database as a consequence of the transaction. As the redo data is produced, it is sent to the standby database system. The standby database system thus receives a stream of redo data from the primary database system. The standby database system is initially constructed from a copy of the primary's database. As the standby database system receives the redo data, it first stores it in persistent storage and then applies the redo data to its copy of the primary's database. If the primary database fails or otherwise has to be taken out of service, the standby database system can replace the primary database system almost immediately. All that is required is that the standby database system apply whatever redo data has not yet been applied to the standby database system's database.

Primary and Standby Data Base Systems Implemented Using Oracle Data Guard Software: FIG. 1

Oracle Corporation, of Redwood City, Calif., manufactures and sells software for making a database system that includes a primary database system and a standby database system. The software is sold under the Oracle® Data Guard name (henceforth "Data Guard"). Data Guard is described in detail in *Oracle Data Guard, Concepts and Administration*, 10g Release 2 (10.2), Oracle Corporation part number B14239-04, March 2006 (henceforth "Data Guard Concepts"), which is hereby incorporated by reference into the present patent application. Data Guard provides users of the primary database system with three levels of protection against data loss:

Maximum protection

This mode offers the highest level of data protection. User sessions connected to the primary database system perform transactions which change the database in the primary database system. As the primary database system performs transactions, it generates redo data. As the redo is generated, it is stored in a persistent redo log in the primary database system and a copy of the redo data is synchronously transmitted (SYNC) to the standby database system from the primary database system. When the redo data is received in the standby database system, it is stored in a persistent redo log in the standby database system and then applied to the standby database system to keep the database in the standby system identical to the database in the primary system. When the primary database system has completed a transaction, copied the transaction to its own redo log, and has received an acknowledgment from the standby that the standby has copied the transaction to its redo log, the primary database system sends a commit acknowledgement to the user session that the transaction has been committed in the primary database system. This mode of operation guarantees no data loss because when the primary database system sends the commit acknowledgment to the user session, both the primary database system and the standby database system haven written the redo data for the transaction to persistent storage. When the primary and the standby are operating in the mode just described, they are said to be synchronized. There are two disadvantages of maximum protection mode:

the fact that the primary must wait for an acknowledgment from the standby before it can send the commit acknowledgment constrains the rate at which the primary can perform transactions. The period between the time the primary sends the redo data for a transaction and receives the acknowledgment for the redo data from the standby is termed the commit latency; and if the standby becomes unavailable, so that the primary ceases to receive acknowledgments from the standby, the primary must cease processing transactions. A primary that has ceased processing transactions for this reason is said to have stalled. The standby may become unavailable because the standby has failed or because the communications link between the primary and the standby has failed.

Maximum availability

This mode is similar to the maximum protection mode, including the guarantee of no data loss at least so long as the primary database system and the standby database system remain synchronized with each other with respect to the redo data that is available to each. However, if the standby database system becomes unavailable, the primary continues to process transactions. When this occurs, the primary has generated redo data that has not been stored in persistent storage in the standby and the standby and the primary are thus no longer synchronized with each other. Before the standby and the primary can again be synchronized, the primary must provide all of the redo data that was generated by the primary while the standby was unavailable to the standby. If the primary database system fails before the standby database system is resynchronized with the primary database system, some data may be lost.

Thus, Maximum Protection and Maximum Availability are similar except that in the former protection mode, the primary stalls if it loses its synchronized standby. In contrast, Maximum Availability continues to generate redo even if the standby has become unavailable.

Maximum Performance

This mode offers slightly less data protection to the primary database system, but higher potential performance for the primary than maximum availability mode does. In this mode, as the primary database system processes transactions, the redo data is asynchronously transmitted (ASYNC) to the standby database system. The primary database system sends the commit acknowledgment to the session as soon as it has persisted the redo data for the transaction in the primary's redo log. At a later time, the redo data in the primary's redo log is copied to the standby. Consequently, the speed at which the primary processes transactions is not constrained by the commit latency and if the standby database system becomes unavailable, processing continues unabated on the primary database system.

FIG. 1 is a block diagram of a database system 101 that includes a primary database system 103 and a standby database system 121. The block diagram is a slight modification of FIG. 5-4 of Data Guard Concepts. Primary database system 103's database 107 receives a stream of transactions 105; as the transactions are processed, a stream of redo data is produced which is processed by logwriter (LGWR) process 109. LGWR process 109 sends the redo data both to online redo log files (ORL) 113 and via one or more network server processes (LNSn) 111 and Oracle Network 119 to standby database system 121. In primary database system 103, one or more archiving processes (ARCn) 115 archive the ORL redo data in archived redo log files 117 once the ORL is completed. There is thus a set of ORLs in archived redo log files 117 which contains the redo data belonging to the stream. An ORL is completed when there is no space left in it to hold additional redo, or upon an explicit user request (command) to switch ORL's. The ORL's that a LGWR is writing into is also referred to as a current ORL. An ORL remains current until it is completed.

In standby database system 121, the stream of redo data being written to the current primary ORL also goes to remote file server process (RFS) 123, which writes the redo data to standby redo log files (SRL) 125. After standby database system 121 has written an item of redo data to current SRL 125, it sends an acknowledgment 124 of the write to primary database system 103. SRLs work generally like ORLs; thus there is a current SRL corresponding to the current ORL to which the redo data currently being received from the primary is written. When the current ORL is completed, the primary sends a "completed" packet to the standby and when the RFS 123 receives the "completed" packet, it completes the current SRL. The arrival of a "completed" packet in the standby is one example of an end of redo event. An end of redo event is an event which indicates that the primary is no longer sending redo data to be written to the current SRL. Among the end of redo events are the receipt of a "completed" packet as just described and a failover command. The failover command indicates that the primary database system has become absent and that the standby database system is to become the new primary database system.

The completed SRL contains all of the redo data that was written to the completed ORL. When the current SRL is completed, an archiving process ARCn 127 archives it to archived redo log files 129 in the primary or standby respectively. Thus, as in the primary, there is a set of SRLs that contains the redo data belonging the stream. A real time apply process 131 in the standby applies the redo data in either a complete or current SRL 125 to standby database system 121's database 131. If the real time apply process falls behind in its redo application, and if the SRL has been archived, the real time apply process will apply the redo from the archived log, if necessary. If database 131 is a physically exact copy of database 107, the redo data may be applied in the form in which it is received from LGWR 109 (MRP/LSP); if database 131 is logically equivalent to database 107, (i.e., the effect of executing a given SQL statement on the two databases is the same), the redo data is translated into equivalent SQL statements. The SQL statements are then executed in database 131.

As shown in FIG. 1, the transfer of redo data from primary database system 103 to standby database system 121 is synchronous: when LGWR 109 transmits an item of redo data to standby database 121, it waits until it has received acknowledgment 124 from standby database 103 to provide commit 110 indicate to primary database system 103; only after LGWR 109 has so indicated does the user transaction that generated the redo get a commit acknowledgement. As previously described, the speed at which the primary database 103 can process transactions depends on the commit latency. The commit latency in turn depends on the latency of acknowledgment 124 That latency has three parts: two network latencies and a write latency. The two network latencies are the length of time it takes for the redo data to be transferred from LGWR 109 to RFS 123 and the length of time it takes for the acknowledgment to be transferred from RFS 123 to LGWR 109. The write latency is the length of time it takes RFS 123 to write the item of redo data to SRL 125. As network speeds have increased, the write latency has become the major component of the latency of acknowledgment 124. The latency of acknowledgment 124 is in turn the major component of the commit latency of primary database system 103.

Primary or Standby Database Systems that are RAC Database Systems: FIGS. 2 and 3

Oracle Corporation has developed a technique for implementing database systems that is termed real application clusters or RAC. A RAC database system is one in which a number of database servers are used to implement a single database system. RAC database systems are described in detail in *Oracle® Database, Oracle Clusterware and Oracle Real Application Clusters, Installation Guide*, 10g Release 2 (10.2) for Linux, Oracle part number B14203-05, December 2005. That publication is hereby incorporated by reference into the present patent application.

FIG. 2 is a block diagram 201 of a RAC database system 202 which is coupled via Internet 205 to a database administrator client 203 and a number of user clients 207(0 . . . n). RAC database system 201 includes a number of database servers 209(0 . . . k), each of which is connected to Internet 205. Each of servers 209 is termed an instance of RAC database system 202. The database servers 209 are coupled to each other by fast interconnect 211. Fast interconnect 211 makes it possible to store data that must be accessible to all database servers 209 in a shared cache 213. A second fast interconnect 213 connects database servers 209 to a set of shared disk drives 215(0 . . . n). These disk drives contain the actual data for the database system. To user clients 207, RAC database system 202 appears to be a single database system.

Data Guard permits RAC database systems to be used either as primary or standby database systems. FIG. 3 is a slightly modified version of FIG. D-2 from Data Guard Concepts. It shows an implementation 301 of Data Guard in which primary database 303 is implemented by two primary RAC instances 209(A) and (B) and standby database 305 is implemented by two standby RAC instances 209(C) and (D). The primary and standby are connected as before by Oracle net 119. In FIG. 3, the numbers within circles indicate local connections, and the numbers within boxes indicate remote connections. In a Real Application Clusters environment, logwriter processes 109 for all of the primary instances write redo data to a set of online redo log files 113 which is accessible to all of the primary instances. Both ORL's at the primary and SRL's at the standby are configured on the set of shared disk drives. Thus ORL's are accessible from all primary instances; Similarly, SRL's are accessible from all standby instances. The stream of redo data from each of the primary instances belongs to a separate redo thread for that instance.

Each ORL is associated with and tightly coupled to a particular thread—Another way to say this, is that, threads cannot reuse each other's assigned ORL's for writing their redo. There are minimally two ORL's for each thread at the primary. This allows the LGWR for a RAC database server to switch into a new ORL (new ORL becomes current) while the previous completed ORL is archived.

Similar to the ORL association with a particular thread, each SRL is tightly coupled to a particular primary thread— i.e. if an SRL has been used to receive redo for a particular primary thread, that SRL cannot be reused to receive redo for another primary thread. DataGuard recommends having one more SRL per thread than the number of ORL's that are configured for the thread. Thus, if there are 3 ORL's configured for a particular thread, then, there should be 4 SRL's configured for that thread at the standby.

LGWR 109 for each of the instances is aware of whether all of the other LGWRs 109 are receiving acknowledgments 124, as indicated by arrow 307. If any of the LGWRs 109 is not receiving acknowledgements 124, standby 305 is no longer synchronized with primary 303. More precisely, a RAC primary database system is synchronized when operating in Maximum Availability when all LGWRs for all the RAC database servers that are up and running have connectivity to the standby database and there is no gap in received redo for any of the threads in the RAC database.

When synchronized, if one RAC primary database server loses connectivity to the standby database, the LGWR on that server messages all the other LGWRs to drop their connections to the standby and stop shipping redo to the standby. When this occurs, the SRLs stop receiving redo from the primary RAC database servers, and the primary database becomes unsynchronized. At a later point in time, once all LGWRs have connectivity to the standby, and all gaps in the redo data have been resolved, the primary database again becomes synchronized.

Any standby instance can receive redo data from any primary instance; a standby instance that is receiving data from a primary is a receiving instance 209(C). All receiving instances write to a set of standby redo log files 125 that are accessible to each of the receiving instances (as explained above, SRL's are configured on the shared disk drives). However, the archived redo log files 129 must ultimately reside on disk devices accessible by the recovery instance 209(D). Transferring the standby database archived redo log files from the receiving instance to the recovery instance is achieved using the cross-instance archival operation. The standby database cross-instance archival operation requires use of standby redo log files 125 that are accessible to all of the standby database instances as the temporary repository of primary database archived redo log files. Using standby redo log files 125 not only improves standby database performance and reliability and allows for implementation of the Maximum Availability mode, but also allows the cross-instance archival operation to be performed on clusters that do not have a cluster file system. Note that a database administrator can also configure the location for archived redo logs (regardless of the particular standby instance from which they were archived) to be visible, or readable, from all instances. This can be done by archiving the completed SRLs on another shared disk, or shared file system that is shared by all the standby Instances—i.e. the file system path to a particular archived log is the same, and is accessible, from all instances. In such configurations, cross-instance archival operations from one standby instance to another are not required. A similar arrangement is possible at the primary, so that the primary instance from which archived logs are backed to tape (long-term storage) can access archived logs generated at any primary instance. Again, in such cases, cross-instance archival operations are not necessary at a primary that is a RAC database.

Details of Standby Redo Log 125: FIG. 4

An Oracle database system includes a system global area (SGA) which contains information that is global to the entire database system. In the case of a RAC database system, the SGA is stored in shared cache 213. Included in the SGA is information about the redo log files. Shown at 411 is a database system-provided view V$STANDBY_LOG 411 which contains the information maintained in the database system about standby redo log files 125. Each standby redo file has a group number, a thread number indicating the redo thread that the file belongs to, a sequence number which indicates the file's position in the set of redo files for the thread, the number of bytes in the file, the number of those bytes that are actually being used, whether the file has been written to an archived redo log file 129, the status of the file, the lowest system change number (SCN) in the file and the data stamp for that SCN, and the highest SCN in the file and the data stamp for that SCN. All of this information except the status information and the archived information will be the same in the completed standby redo file and the completed on-line redo log file 113 it corresponds to.

The packets that contain the redo data include the group number, thread number, and sequence number of the on line redo log file 113 the standby redo log file 125 corresponds to. The system change numbers are also contained in the packets. A system change number is a monotonically increasing value which identifies the redo data for a given change in the database system. Except when more than one thread is changing the same set of database records concurrently, SCNs are issued independently for each thread, that is, the SCNs for each thread increase monotonically, but there is no relationship between an SCN in one thread and an SCN in another.

If two RAC threads update the same data block (database records), the redo that describes the changes to the data block has to be ordered by SCNs. It is critical from a correctness perspective, that the first thread that modifies the data block, say Thread X, generates redo at an SCN A that is strictly smaller than SCN B (i.e. A<B), where B is the SCN for the redo generated for the same data block in the other thread, say Thread Y. Redo generated by Thread Y in this example depends on Thread X's redo. The LGWR for Thread X has to commit redo generated by Thread X before LGWR for Thread Y can commit its redo for the data block. Effectively, the RAC environment ensures that the LGWR commit code paths get serialized if there is dependent redo as described here.

With dependent redo, it is very important that the SCNs be properly ordered in the redo data. Were the database to crash, and should we need to crash recover the database, with respect to the above example, it is critical that we apply the redo generated by Thread X before we apply the redo generated by Thread Y. Changing the order of redo application (applying redo at SCN B before SCN A) would cause the database to become inconsistent—i.e. the database would contain changes to tables that never existed in the database in the past.

When a primary is operating in Maximum Availability, is using the SYNC transport, and is synchronized with the standby, Data Guard guarantees that the ordering of LGWR commits for dependent redo at the primary ORL's is maintained for the corresponding write to SRL's as well. That is, redo is written to the SRL for thread X at the standby before it is written to the SRL for thread Y at the standby.

If two threads at the primary generate redo for different data blocks, there is no particular relationship between the SCN recorded in the redo. The SCNs can be same or different.

MRP/LSP (apply processes) cannot distinguish by looking at the SCNs in redo from various threads whether is the redo is dependent or not. The apply process employs a simple algorithm that always applies all redo at SCN X from all threads before applying redo at SCNs>X. SCNs are monotonically increasing, and it is possible to have SCN gaps within the same thread.

The redo data in an ORL or SRL is stored in a log file. The particular form of log file disclosed herein is termed in the following a logfile. At 401 In FIG. 4 may be seen a diagram of a logfile in an SRL 125. Each logfile 401 has a header 403 which includes the information from the V$STANDBY_LOG view 411 for the logfile. Also included is a no data lost (NDL) flag 405. When an ORL is completed, LGWR process 109 indicates to the standby whether the standby is synchronized. If it is, RFS process 123 sets the NDL flag in the new current SRL that corresponds to the new ORL. The flag thus indicates that there are no previous gaps in the stream of redo data to which the redo data being written to the SRL's logfile belongs. If the standby and the primary lose synchronization, RFS process 123 resets the NDL flag in the current SRL. A NDL flag in the current SRL which is reset, either because it was reset when the SRL was created or because of a loss of synchronization while the current SRL was receiving redo data, is not set again in the current SRL until the gap in the stream of redo data has been eliminated and the primary and standby are again synchronized. When an end of redo event occurs, the NDL flag in the current SRL remains set as it was at the time of the event. The remainder of the logfile consists of chunks of redo data 409, each one including the SCN 407 that is associated with the change specified by the chunk of redo data.

When a primary database fails, and a failover to the standby occurs, the process of applying the received redo data to the standby's database prior to making the standby the new primary database is referred to as Terminal Apply. During terminal apply, a decision needs to be made during redo apply whether we can apply all/the redo from all/the threads that had been received in the standby that was received at the time of the primary's failure. Note that the last bit of redo received from each thread at the time of the failure can be at various SCNs. How do we know it is safe to apply all the redo from all the threads (i.e. how do we know we are not dealing with dependent redo)?

This is where the NDL flag is used intelligently—If all the SRLs that are to be applied to the standby have their NDL flag set, then the operational steps described earlier with Maximum Availability guarantee that all/the redo in the SRLs can be safely applied to the standby database during the failover. We refer to such a Terminal Apply process (where all redo from all threads can be applied during failover) as Complete Terminal Recovery.

However, if the NDL flag is not set one in one or more SRLs that are to be applied to the standby, then, the apply process during failover cannot proceed to apply redo past the highest SCN that is common across all threads. In this case, some data is lost during failover, and such a terminal apply process is referred to as Incomplete Terminal Recovery.

Problems of Prior Art Data Base Systems with Primary and Standby Database Systems The advantage of the prior art database systems with primary and standby database systems is that because the primary receives an acknowledgment 124 from the standby only after an item of redo data has been written to the current SRL, when an end of redo event occurs and the current SRL has its NDL flag set, two things are true: there are not gaps in the stream of redo data either in or prior to the current SRL and the primary received acknowledgments for all of the redo data contained in the current SRL. Consequently, simultaneous failure of the primary and the standby cannot result in loss of data for which a commit acknowledgment was sent to the user's session. The disadvantage is the commit latency in the primary that results from the requirement that the standby wait until the redo data has been written to SRL 125 before sending commit signal 124 to the primary.

There are many circumstances in which the prior art's tradeoff between data protection and commit latency is not optimum. Simultaneous failure of the primary and standby is extremely unlikely unless the primary and standby share a single location or a single power supply. In most systems having primary and standby database systems, the primary and standby are at widely separated physical locations and have independent power supplies. What is needed is a way of obtaining a more optimal tradeoff between data protection and commit latency in systems which have a low probability of simultaneous failure of the primary and standby.

BRIEF SUMMARY OF THE INVENTION

The object of obtaining a more optimal trade off between data protection and commit latency is achieved in one aspect of the invention by a method practiced in the standby database system of acknowledging the receipt of an item of redo data to the primary database. The item of redo data belongs to a stream of redo data and the method reduces the time required to acknowledge the received redo data item to the primary database. The method's steps include writing the received redo data item to non-persistent storage in the standby database system; acknowledging the receipt of the received redo data item to the primary database system; and thereupon writing the received redo data item to the primary database system.

In the foregoing method of acknowledging the receipt of an item of redo data, the standby database system's persistent storage may include a log file to which the received stream of redo data items are written. The log file may include no data loss data indicating that there is no gap in the stream of redo data items to which the redo data items contained in the log file belong. In such a case, the method may include the following steps that are performed when the an end of redo event occurs in the standby:

writing any remaining received redo data items for the first log file in the non-persistent storage to the first log file; and If there is otherwise no gap in the redo data stream, thereupon setting the no data loss data to indicate that there is no gap in the stream of redo data items to which the redo data items contained in the log file belong.

The foregoing method of acknowledging the receipt of an item of redo data may further include the step of receiving an acknowledgement mode indication in the standby database system that indicates that the foregoing method is to be practiced in the standby database system. The acknowledgement mode indication may additionally indicate a second method of acknowledging the receipt of an item of redo data in which the receipt of the item of redo data is acknowledged to the primary database system when the item of redo data has been written to the persistent storage and the standby database system performs the foregoing method of acknowledging the receipt of an item of redo data or the second method as indicated by the acknowledgment mode indication. In this method, the no data loss data has the same semantics in both methods.

In a further aspect of the invention, the object of obtaining a more optimal trade off between data protection and commit latency is achieved by a redo log file to which a standby database system writes items of redo data. The items of redo data belong to a stream of redo data items that the standby database system receives from a primary database system. The standby database system sends an acknowledgment of the receipt of an item of redo data prior to writing the item of redo data to the redo log file. The redo log file includes items of redo data that have been received in the in the standby database system and written to the redo file and a no data loss indicator that indicates after an end of redo event whether there are gaps in the redo stream that was being written to the redo log file. The no data loss indicator only indicates that there are no gaps only if there is otherwise no gap in the redo data stream and all of the items of redo data received in the standby database system for the redo log file have been written to the redo log file.

In yet another aspect of the invention, the object of obtaining a more optimal trade off between data protection and commit latency is achieved by a database system that includes: a primary database system that is coupled to a communications network and a standby database system that is coupled to the communications network. The primary database system sends a stream of redo data items for a transaction belonging to a session to the standby database system. The standby database system responds after receiving a sent redo data item by sending a first acknowledgement to the primary database system. The primary database system responds to the first acknowledgement by sending a second acknowledgment to the session. The database system of the invention is characterized in that the database system has an acknowledgement mode in which the standby database system sends the first acknowledgment to the primary database system prior to writing the redo data item to persistent storage. In this aspect of the invention, the database system may also operate in an acknowledgment mode in which the standby database system sends the first acknowledgment to the primary database system after writing the redo data item to the persistent storage. Moreover, a log file in the standby database system to which redo data items belonging to the stream are written may include a no data loss indicator that has the same semantics in a completed log file in either acknowledgment mode.

Still further aspects of the invention are storage devices which contain programs that when executed implement the inventions and storage devices which contain redo log files made according to the invention.

Other objects and advantages will be apparent to those skilled in the arts to which the invention pertains upon perusal of the following Detailed Description and drawing, wherein:

Figure 2:
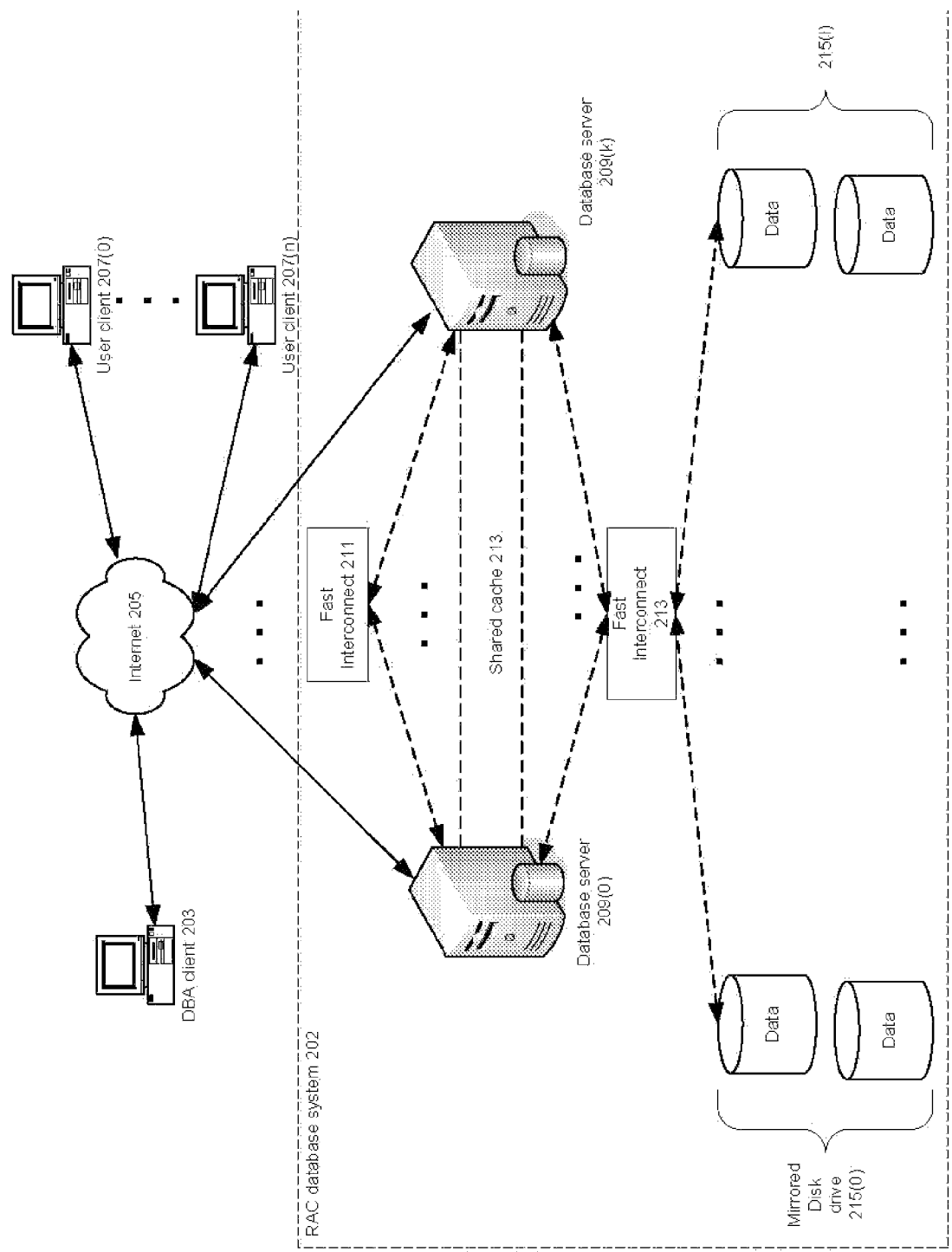
FIG. 2 is a block diagram of a real application cluster database system.
Figure 3:
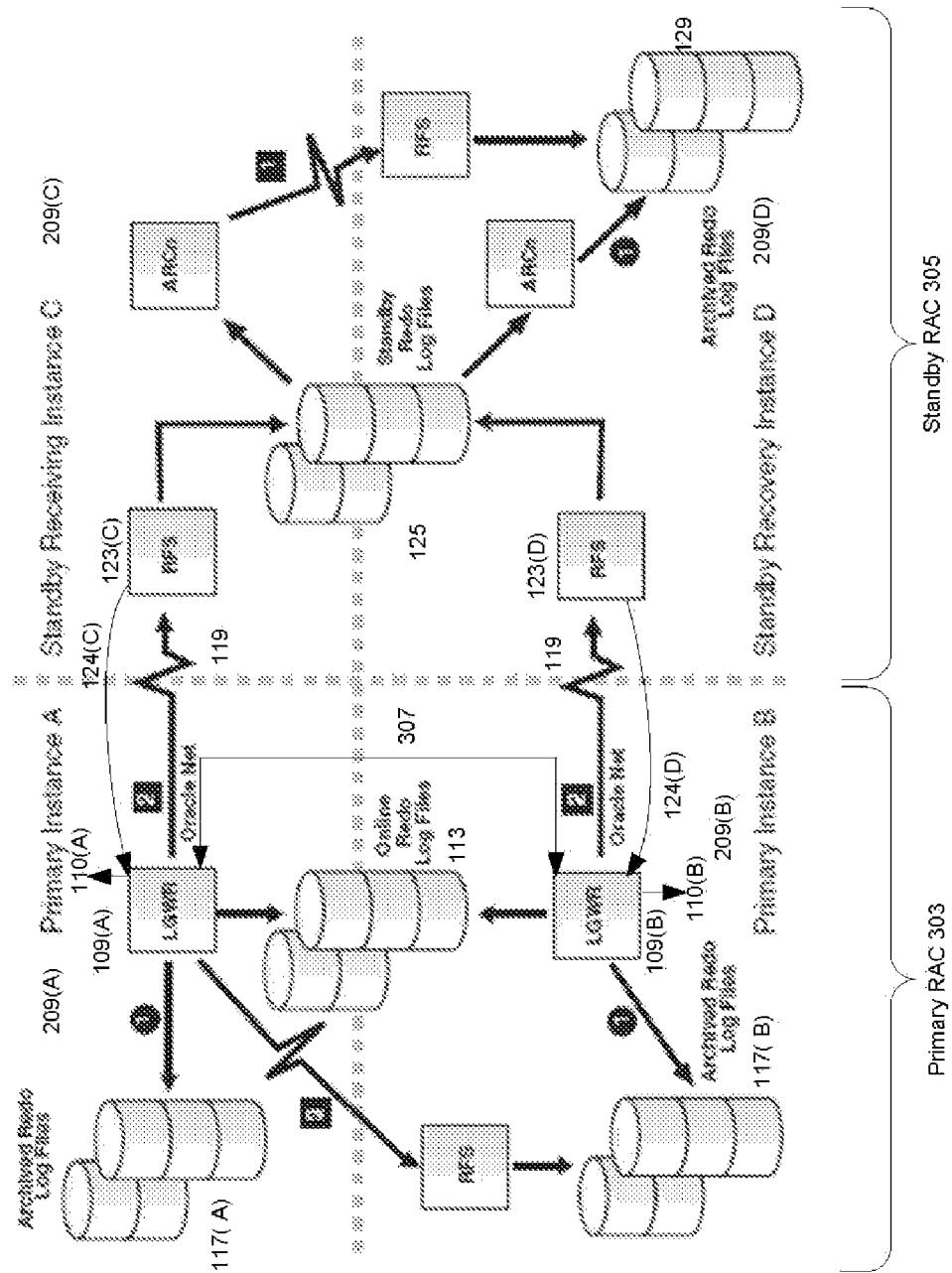
FIG. 3 is a block diagram of a second prior-art database system in which the primary database system and the standby database system are real application cluster database systems.
Figure 4:
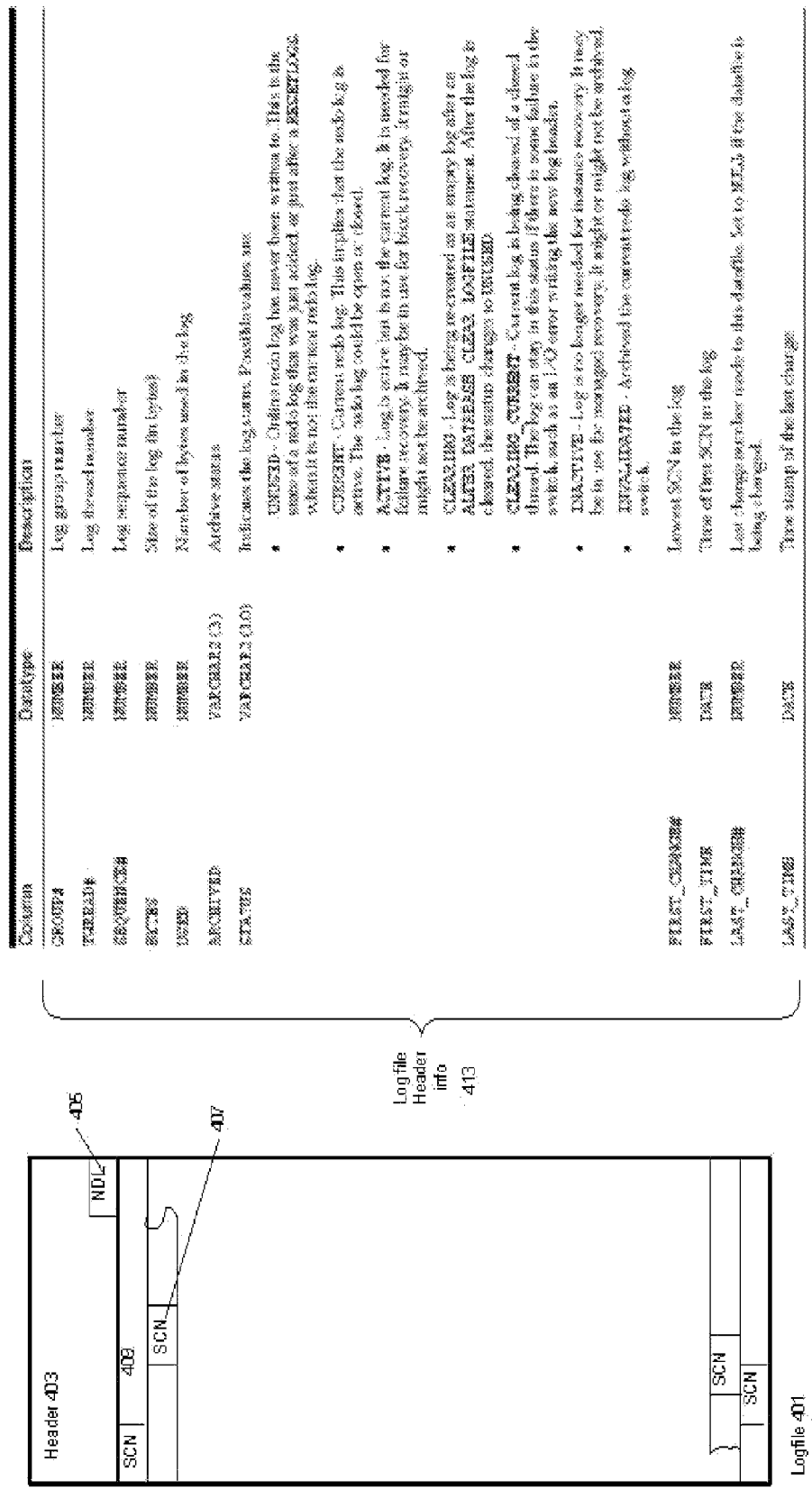
FIG. 4 shows details of logfiles in the prior-art database systems of FIGS. 1 and 3.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

Figure 5:
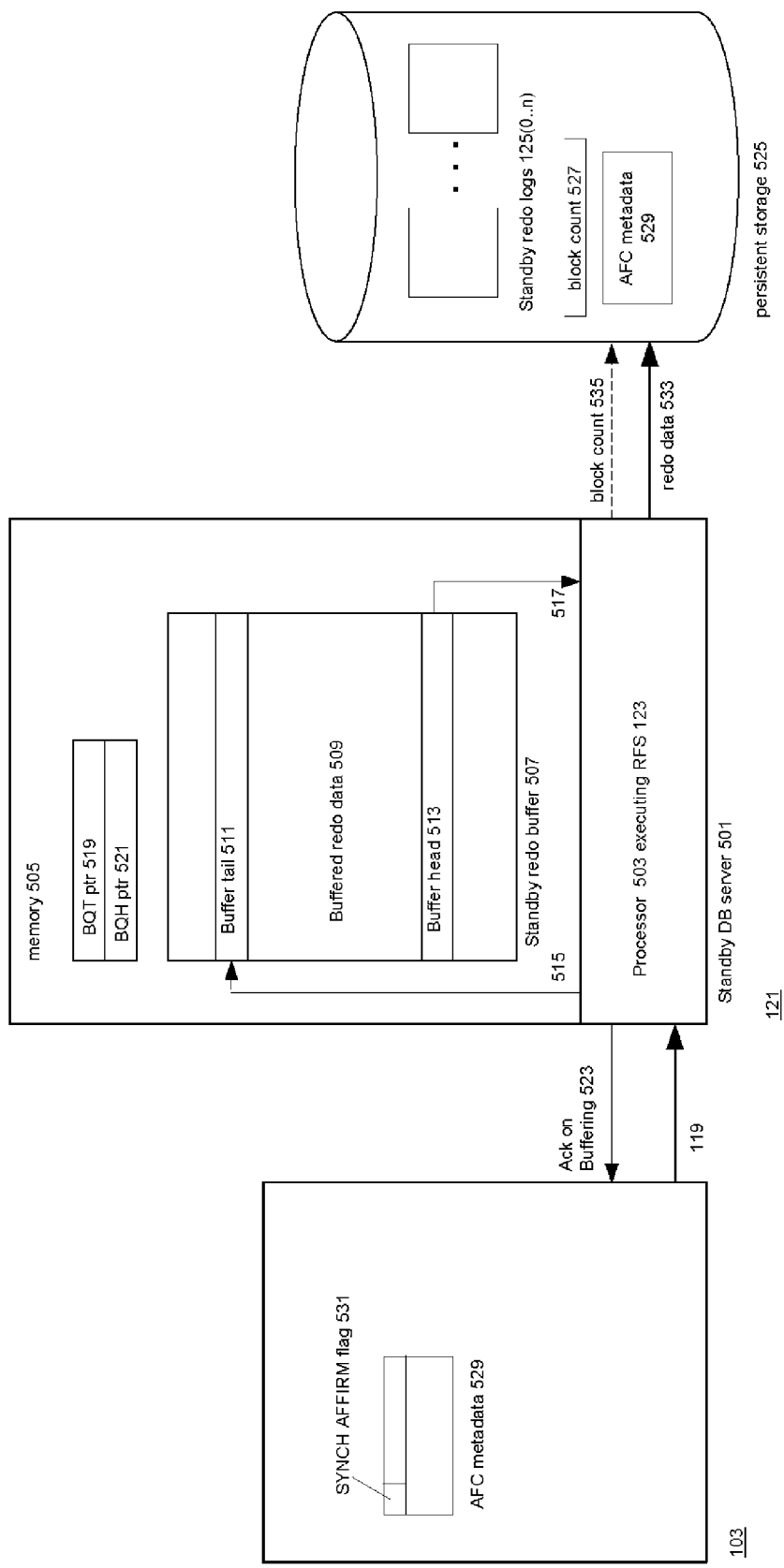
FIG. 5 shows how the standby provides acknowledgments in the invention.

Overview of the Invention: FIG. 5

The invention reduces commit latencies at the primary database while maintaining the data loss guarantees of Maximum Availability as long as the primary and the standby do not become unavailable simultaneously. The invention thus takes advantage of the fact that simultaneous failures of the primary and the standby are extremely rare.

Since that is the case, double failures will generally be sequential: either the primary will fail before the standby or vice-versa. In the first case, the standby will be able to continue processing the redo data that it received from the primary prior to the primary's failure but has not yet written to SRL 125; in the second case, when the standby fails, the primary has its copy of the data up to the point where the standby failed.

Because simultaneous failure is the only situation where the primary fails and the standby will not be able to store all of the redo data it has received thus far from the primary in SRL 125, the commit latency in the primary can be reduced by sending the acknowledgement to the primary when the redo data arrives in the standby, rather than when the redo data is stored in standby redo log 125. Sending the acknowledgment at that point removes the write latency (time to write redo persistently to the current SRL) from the commit latency, and as indicated above, in many cases, the write latency is the greater part of the commit latency.

Figure 1:
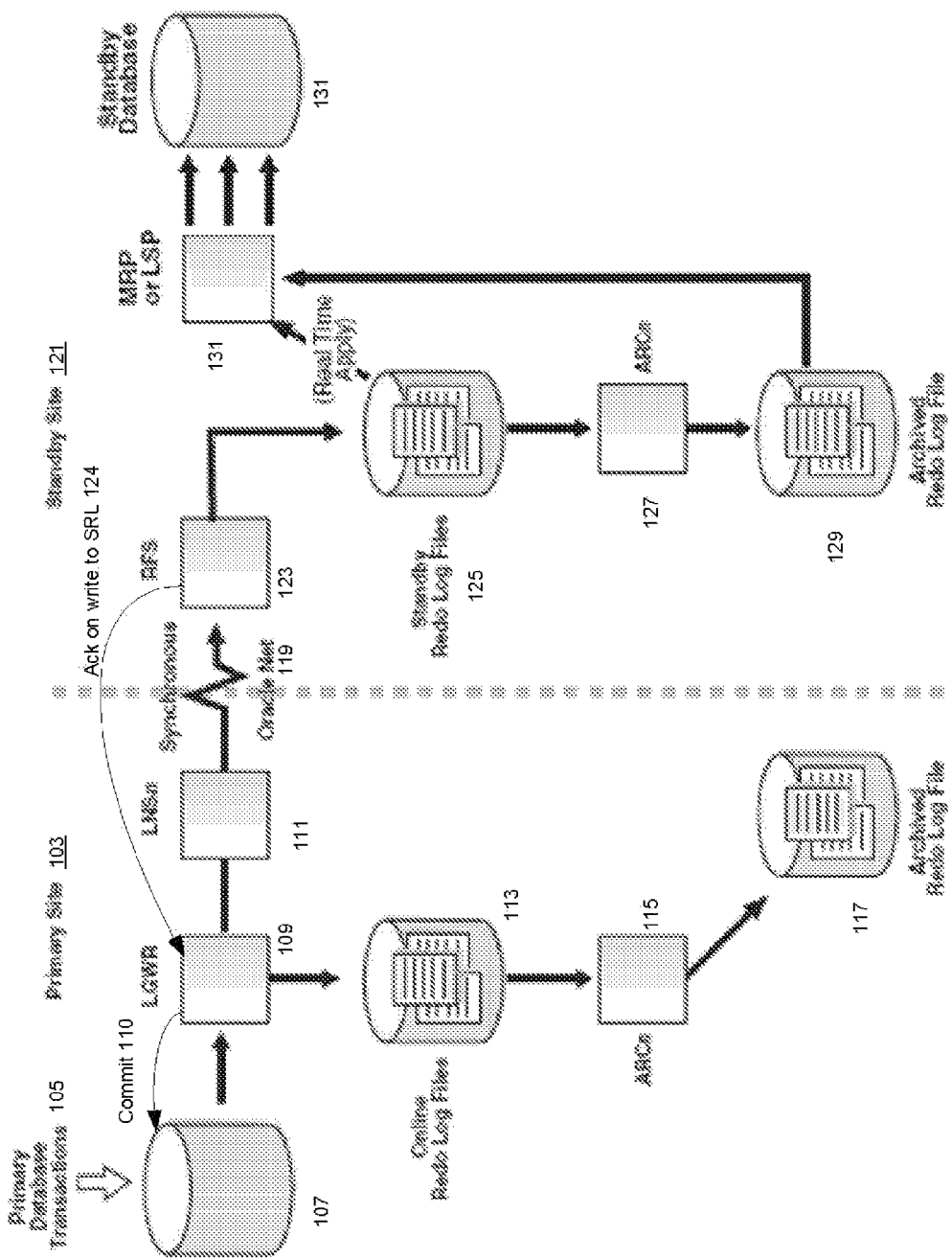
FIG. 1 is a block diagram of a first prior-art database system with a primary database system and a standby database system.

FIG. 5 shows how the foregoing may be implemented in a standby database system such as standby database system 121 of FIG. 1. In FIG. 5, RFS 123 is executing on a processor 503 in database server 501 belonging to the standby database system. Memory 505 accessible to processor 503 includes a standby redo buffer 507. When standby database system 121 receives redo data via network 111, RFS 123 writes the redo data to standby redo buffer 507. RFS 123 then reads the redo data from buffer 507 and writes it to standby redo log 125. As shown at 523, RFS 123 sends an acknowledgment to primary database system 523 when the redo data is placed in redo buffer 507. Redo buffer 507 is organized as a queue: as RFS 123 receives redo data from primary 103, it places the redo data at the tail of the queue, shown at 511; as RFS 123 writes the redo data to standby redo log 125, it reads it from the head of the queue, shown at 513. As RFS 123 writes new incoming redo data to buffer 507, and after it reads from buffer 507 to write the redo durably to the SRL, it updates BQT pointer 519 to point to the current buffer tail 511 and BQH pointer 521 to point to the current head 513.

Figure 6:
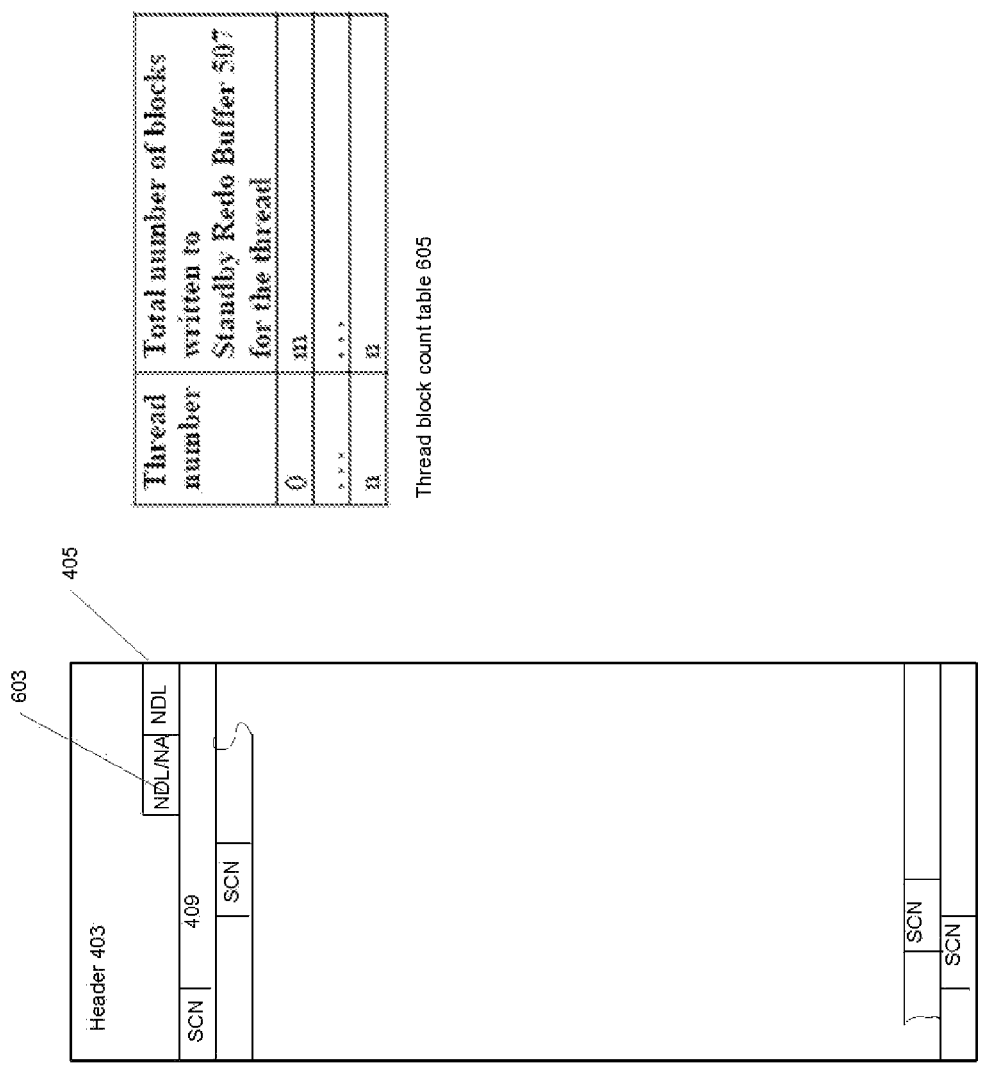
FIG. 6 shows the logfile of the invention with the NDLA and NDL flags and a table that is used to determine when the standby can reset the NDLA flag and set the NDL flag.
Figure 7:
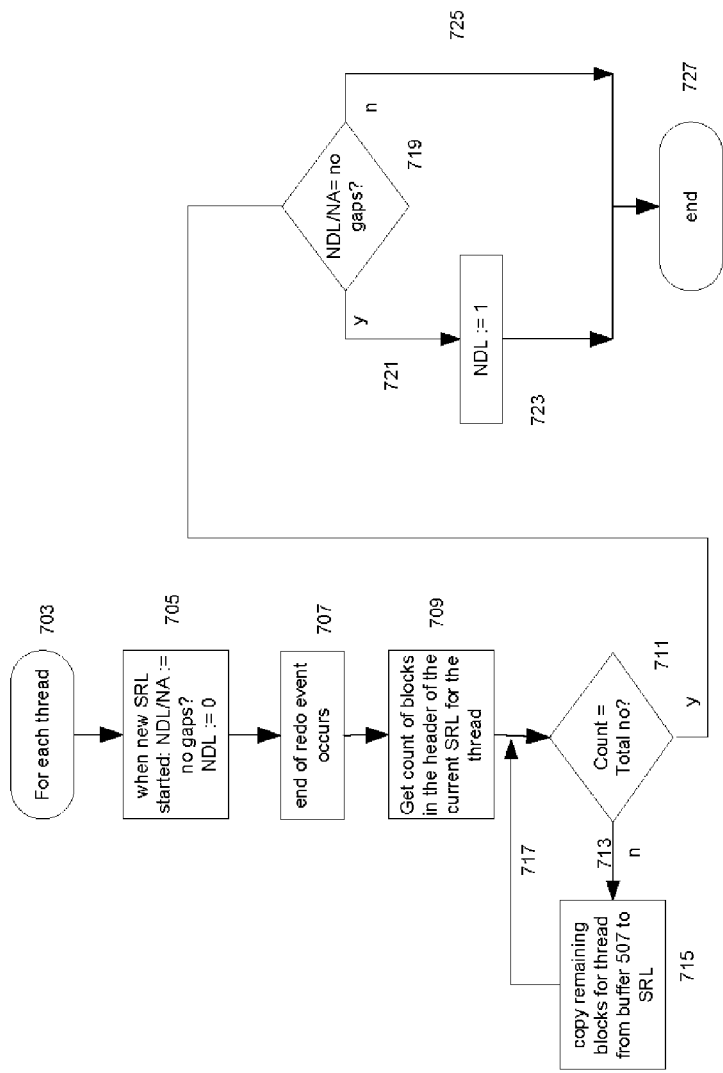
FIG. 7 is a flowchart showing how the NDLA flag is reset and the NDL flag is set.

Accommodating the Invention in System 101 and System 301: FIGS. 5-7

Systems 101 and 301 are built on the assumption that acknowledgment 124 indicates that the redo data sent by the primary has been written to SRL 125 in the standby. Consequently, if NDL bit 405 is set in the current SRL when an end of redo event occurs, it is certain that there are no gaps in the stream of redo data that is being written to the current SRL.

When the standby sends acknowledgments 523 as soon as the redo data items are received in standby redo buffer 507 instead of acknowledgments 124 when the redo data items are written to SRL 125, the fact that LGWR 109 has received all of the acknowledgments 523 means only that all of the redo items have been buffered in the standby, not that they have been written to current SRL 125; if the standby fails between the time the redo items have been buffered and the time they are written to current SRL 125, the data that was in the buffer will be lost and the copies of the logfile in current ORL 113 and current SRL 125 will not be identical.

To deal with the fact that acknowledgment 523 does not indicate that the redo data received in the standby has been written to current SRL 125, the implementation of the invention in systems 101 and 301 adds an additional flag NDL/NA 603 to header 403 of logfiles 601 in SRLs and changes the manner in which NDL flag 405 is set. The semantics of NDL flag 405 remain the same: if NDL flag 405 is set after the current SRL has been completed, there are no gaps in the redo stream which was being written to the current SRL. If it is reset, there is a gap in the redo stream. NDL/NA flag 603 is needed because with acknowledgment 523, there are two sources of lost data: as before, gaps in the redo data stream received from the primary, and now in addition, redo data that has arrived in the standby and been acknowledged, but has not yet been written to the current SRL. The latter redo data can of course be lost if the standby fails before the redo data is written. NDL NA behaves like the NDL flag, except that it is not used to determine data loss after an end of redo event: In the current SRL 125, the flag is set if there no gaps in the redo stream when the current SRL becomes the current SRL and is reset either if LGWR 109 indicates that there are gaps in the redo data stream at the time the current SRL is created or gaps occur in the redo data received by the current SRL. Once reset, the flag remains reset until the standby and primary are again synchronized. NDL flag 405 is reset when the current SRL becomes the current SRL and is set after an end of redo event when the following conditions are both true:

all of the redo data that has been received in the standby up to the occurrence of the "end of redo event" has been written to the current SRL 125; and NDL/NA flag 603 is set.

NDL flag 405 is thus set only when there is neither a gap in the redo data stream (indicated by the fact that NDL NA flag 603) is set nor any redo data that has been received in the standby for the current SRL 125 which has not been written to the current SRL.

RFS 123 determines whether all of the redo data received for the current SRL 125 has been written to it as follows: As the redo data for file 601 in the current SRL comes in, RFS 123 maintains a block count value 527 in persistent storage 525 indicating the number of blocks of the file that have been received in standby redo buffer 507. When an end of redo event occurs, RFS 123 compares the number of blocks in logfile 601 with the number of blocks specified for the file in the persistent storage. If the numbers agree, all of the redo data that was sent to standby 121 is in SRL 125. When the numbers agree, RFS 123 sets NDL flag 401 in logfile 601's header.

A further advantage of using both NDL flags 405 and NDL/NA flags in logfiles 601 is that database system administrators (DBAs) of systems 101 or 301 may make their own tradeoffs between data protection and commit latency. Two options are offered in a preferred embodiment: SYNCH AFFIRM and SYNCH NOAFFIRM. These options are implemented as a SYNCH AFFIRM flag 531 in AFC metadata 529. Primary database system 103 maintains a master copy of AFC metadata 529 which it propagates to standby 121 whenever the master copy changes. Where the highest degree of data protection is desired, the DBA may set flag 531 to SYNCH AFFIRM and in such systems, the acknowledgments 124 are sent when the redo data is written to SRL 125, the NDL flag 405 works as described in the discussion of the prior art, and NDL/NA is ignored. When the DBA is willing to accept the small chance of simultaneous failure of the primary and the standby and the resulting data loss in order to gain substantial reductions in commit latency, the DBA may set flag 531 to specify SYNCH NOAFFIRM. When the setting of the flag is propagated to the standby, RFS 123 determines whether there are gaps in the preceding redo data and sets NDL/NA flag 603 in the current SRL's logfile 601 if there are none and otherwise resets flag 603 and then resets NDL flag 405 in the current SRL's logfile 601. Thereupon, RFS 123 issues acknowledgments 523 to the primary database system when the redo data items are stored in buffer 507, and when an end of redo event occurs, RFS 123 ensures that all of the redo data items for the current SRL in buffer 507 have been written to the current SRL and then sets NDL flag 405 if NDL/NA flag 603 is set. Thus, in SYNCH NO AFFIRM, NDL/NA flag 603 in the SRL takes over the role of indicating whether there are gaps in the preceding redo data, while making NDL flag 405 dependent both on the lack of gaps and on all of the received redo data being written to the current SRL deals with the additional data loss possibilities resulting from sending acknowledgements to the primary prior to writing the redo data to the current SRL.

In both the SYNCH AFFIRM and SYNCH NO AFFIRM modes, an SRL whose NDL flag 405 is set contains redo items from a stream of redo items that has no gaps. Consequently, an SRL whose NDL flag is set may be used to update the standby's database so that it contains a copy of the primary database system as of the time the primary data base system sent the last redo data item in the SRL to the standby. For example, if the standby's database is currently a copy of the primary's database as it was as of a past time and there are SRLs that have their NDL bits set from the current SRL back to the SRL that includes the redo data items that were being received at the past time, and a failover occurs, the SRLs from the current SRL back can be used to update the standby's database so that it is a copy of the primary's database as of the time of the failover. Once that has been done, the standby can take over for the failed primary.

In systems 301 that are using RAC database systems 202, a further problem must be dealt with, namely that RFS 123(C) and 123(D) are receiving and writing redo data belonging to different threads. To keep track of the number of blocks written to the redo files by the threads, the RFSs 123 in standby RAC 305 use a table in persistent storage that is accessible to all of them instead of block count 527. The table is shown at 605 in FIG. 6. It contains an entry for each thread and the total number of blocks written to redo buffer 507 for the thread.

FIG. 7 is a flowchart 701 showing how the NDL/NA bit and the NDL bit are set when the standby is operating in SYNCH NOAFFIRM mode and a new current SRL is created and how the NDL bit is set after an end of redo event occurs. As indicated at 703, for each thread, when a new SRL is started, the NDL/NA flag is set if the primary and standby are synchronized with regard to the redo thread and reset if they are not. The NDL flag is reset (705). When an end of redo event occurs (707), the count of blocks that is maintained in the header of the current SRL for the thread is checked (709,711); if it the same as the count of blocks indicated for the thread in thread block count table 605, all of the blocks that were received in the standby for the thread have been written to the SRL. Otherwise, blocks are copied from buffer 715 to the SRL until all of the blocks are written (713, 715, 717). When all of the blocks are written, RFS 123 checks whether NDL/NA indicates no gaps in the redo data stream (719); if no gaps are indicated, the NDL flag is set (721,723); otherwise it is not (725). NDL flag 405 is thus set only if two conditions are true:
the standby did not fail while the blocks for the thread in buffer 507 were being written to the current SRL; and
there are no gaps in the redo data stream being written to the current SRL.

Because NDL flag 405 has the same semantics in both SYNCH AFFIRM and SYNCH NO AFFIRM, SYNCH NO AFFIRM and NDL/NA flag 603 can be added to database systems 101 and 103 without altering the manner in which terminal recovery is performed.

Conclusion

The foregoing Detailed Description has disclosed the inventors' techniques for providing a more optimal trade off between data protection and commit latency to those skilled in the relevant technologies and has further disclosed the best mode presently known to the inventors for practicing their techniques. It will, however, be immediately apparent to those skilled in the relevant technologies that many other modes of practicing the techniques are possible. In particular, the technique requires only that the acknowledgment be sent prior to the redo data item being persisted; exactly when and how the acknowledgment is sent may vary from implementation to implementation, as may the manner in which the redo data item is stored and/or processed between the time it is received in the standby and the time it is persisted. Further, where a database system has one mode of operation in which it sends the acknowledgment before the redo data item is persisted and another in which it sends the acknowledgment after the redo data item is persisted, there are many different ways in which information about what mode is being used may be propagated to components of the database system. Finally, there are many possible ways of indicating in the redo log during receipt of a stream of redo data items whether there are gaps in the stream of redo items and indicating after an end of redo event that there are no gaps in the completed redo log.

It should further be understood that the embodiment described herein is implemented in a commercial database system that has a history of over thirty years of continuous development and commercial use, and that many of the particular implementations described herein have been determined by existing characteristics of the database system and/or by the need to remain compatible with existing components of the database system. Thus, in a preferred embodiment, the NDL flag in a completed SRL has the same semantics in SYNCH AFFIRM and SYNCH NO AFFIRM. For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. A method practiced in a standby database system, the standby database system including a processor that has access to non-persistent storage and to persistent storage and the method comprising the steps performed by the processor of:
receiving a redo item belonging to a stream thereof produced by a primary database system:
writing the received redo data item to the non-persistent storage;
acknowledging the receipt of the received redo data item to the primary database system;
writing the received redo data item from the non-persistent storage to a log file for the stream in the persistent storage
when an end of redo event for the stream occurs in the standby database system, writing any remaining received redo data items for the log file in the non-persistent storage to the log file: and
when there is otherwise no gar in the stream, thereupon setting no data loss data in the log file to indicate that there is no gar in the stream, whereby the time required to acknowledge the received redo data item to the primary database system is reduced.

2. The method set forth in claim 1, wherein
the standby data base system includes redo file size data in the persistent storage which indicates the total size of the items of redo data received in the standby data base system for the log file; and
the method further comprises the step of:
upon occurrence of the end of redo event, using the redo file size data to determine whether all of the received redo data items for the log file have been written to the log file.

3. The method set forth in claim 2 wherein the method further comprises the step of:
when the received redo data item is received in the non-persistent storage, updating the redo file size data to indicate the total amount of redo data received thus far for the log file.

4. The method set forth in claim 1, wherein
the standby database system receives streams of items of redo data from a plurality of threads;
there is a plurality of the log files;
for each thread, there is a corresponding log file of the plurality, the corresponding log file for a thread containing redo data only from that thread's stream the standby database system includes redo file size data which indicates the current size of the received redo data for the log file for each thread; and the method further includes the step of using the redo file size data for a given one of the threads to determine when all of the redo data has been written to the log file for the given thread.

5. The method set forth in claim 4 wherein the method further comprises the step of:

when the received redo data item is received in the non-persistent storage, updating the redo file size data for the redo data items thread to indicate the total amount of redo data received thus far for the log file for the thread.

6. The method set forth in claim 1, wherein the no data loss data has a first component and a second component; and the method further comprises the steps of:

setting the first component prior to the occurrence of the end of redo event to indicate whether a gap in the stream of redo data items has occurred; and in the step of setting the no data loss data, setting the second component to indicate that there is no gap only if the first component indicates that there is no gap.

7. The method set forth in claim 1, further comprising the step of:

receiving an acknowledgment mode indication in the standby database system that indicates whether the method set forth in claim 1 is to be practiced in the standby database system or a second method in which the receipt of the item of redo data is acknowledged in the primary database system when the received item of redo data has been written to the log file, the no data loss data in a log file to which all of the redo data items received for the log file in the standby database system prior to the end of redo event have been written having the same semantics in both the method set forth in claim 1, and the second method.

8. The method set forth in claim 1 further comprising the step of:

receiving an acknowledgment mode indication in the standby database system that indicates that the method set forth in claim 1 is to be practiced in the standby database system.

9. The method set forth in claim 8 wherein:

the acknowledgment mode indication additionally indicates a second method in which the receipt of the item of redo data is acknowledged to the primary database system when the received item of redo data has been written to the persistent storage; and the standby database system performs the method of claim 1 or the second method as indicated by the acknowledgment mode indication.

10. A data storage device, the data storage device being characterized in that:

the data storage device contains code which, when executed by a processor in a standby database system, performs the method set forth in claim 1.

11. A data storage device characterized in that:

the data storage device contains a redo log file to which a processor in the standby database system which has access to the redo log file writes items of redo data belonging to a stream of redo data that the standby database system receives from a primary database system, the processor sending an acknowledgment of the receipt of an item of redo data to the primary database system prior to writing the item of redo data to the redo log file and the redo log file comprising:

items of redo data that have been received in the standby data base system and written to the redo log file; and a no data loss indicator that indicates after an end of redo event whether there are gaps in the redo stream that was being written to the redo log file, the no data loss indicator including:

a first component that indicates whether there were gaps in the stream of redo data that was being written to the redo log file prior to the end of redo event; and a second component that indicates no data loss only if the first component indicates no gaps prior to the end of the redo event and all of the items of redo data for which the standby database system has sent acknowledgments to the primary database system have been written to the redo log file.

12. The redo log file set forth in claim 11 wherein:

the standby data base system operates in a first mode wherein receipt of an item of redo data is acknowledged to the primary database system after the item of redo data has been written to the log file and a second mode wherein receipt of an item of redo data is acknowledged to the primary database system before the item of redo data has been written to the log file; and the second component indicates whether there are gaps in a completed log file's redo data stream in both the first and second modes of operation.

13. A database system comprising:

a primary database system coupled to a communications network; and a standby database system coupled to the communications network, each at the primary database system and the standby database system having a processor and persistent storage to which the processor has access and the primary database sending a stream of redo data items for transactions belonging to one or more sessions to the standby database system via the communication network, the standby database system responding after receiving a sent redo data item for a given session by sending a first acknowledgement to the primary database system via the communications system, and the database responding to the first acknowledgement by sending a second acknowledgement to the given session, the standby system writing the redo data items to a log in the standby system's persistent storage, the log file including a no data lost indicator that indicates that no gaps have occurred in the stream, and the database system being characterized by:

an acknowledgement mode in which the standby database system sends the first acknowledgment to the primary database system prior to writing the redo data item to the standby system's log file; and the standby database responds to an end of redo event by writing any redo data items intended for the log file that have not been written to the log file thereto and, when no gaps in the stream of redo data items have occurred prior to the end of redo event, setting the no data lost indicator to indicate that there are no gaps in the stream of redo data items.

14. The database system set forth in claim 13, further characterized in that:

the database system has an additional acknowledgment mode in which the standby database system sends the first acknowledgment to the primary database system after writing the redo data item to the persistent storage; and the no data lost indicator in a log file to which all of the redo data items received for the log file in the standby database system prior to the end of redo event have been written has the same semantics in both the acknowledgment mode and the additional acknowledgment mode.

15. The database system set forth in claim 13 further characterized by:
- log file size data in the persistent storage, the log file size data indicating the size of the log file when all of the redo data items intended for the log file have been written thereto, the standby database system using the log file size data to determine whether all of the data items intended for the log file have been written thereto.

16. The database system set forth in claim 13 further characterized in that:
- the database system has an additional acknowledgment mode in which the standby database system sends the first acknowledgment to the primary database system after writing the redo data item to the persistent storage.

* * * * *

UNITED STATES PATENT AND TRADEMARK OFFICE
CERTIFICATE OF CORRECTION

PATENT NO. : 7,599,967 B2
APPLICATION NO. : 11/688550
DATED : October 6, 2009
INVENTOR(S) : Mahesh Baburao Girkar et al.

It is certified that error appears in the above-identified patent and that said Letters Patent is hereby corrected as shown below:

In column 4, line 35, after "124" insert -- . --.

In column 6, line 21, delete "Instances" and insert -- instances --, therefor.

In column 8, line 1, after "apply" delete "all/the" and insert -- all the --, therefor.

In column 8, line 1, after "from" delete "all/the" and insert -- all the --, therefor.

In column 8, line 11, delete "all/the" and insert -- all the --, therefor.

In column 11, line 57, delete "NDL NA" and insert -- NDL/NA --, therefor.

In column 14, line 39, in claim 1, delete "file:" and insert -- file; --, therefor.

In column 14, line 40, in claim 1, delete "gar" and insert -- gap --, therefor.

In column 14, line 42, in claim 1, delete "gar" and insert -- gap --, therefor.

In column 14, line 67, in claim 4, delete "stream" and insert -- stream; --, therefor.

In column 15, line 52, in claim 5, delete "items" and insert -- item's --, therefor.

In column 16, line 29, in claim 13, delete "at" and insert -- of --, therefor.

In column 16, line 38, in claim 13, delete "database" and insert -- primary database system --, therefor.

In column 16, line 40, in claim 13, after "log" insert -- file --.

Signed and Sealed this

Third Day of August, 2010

David J. Kappos
*Director of the United States Patent and Trademark Office*